Figure 2:
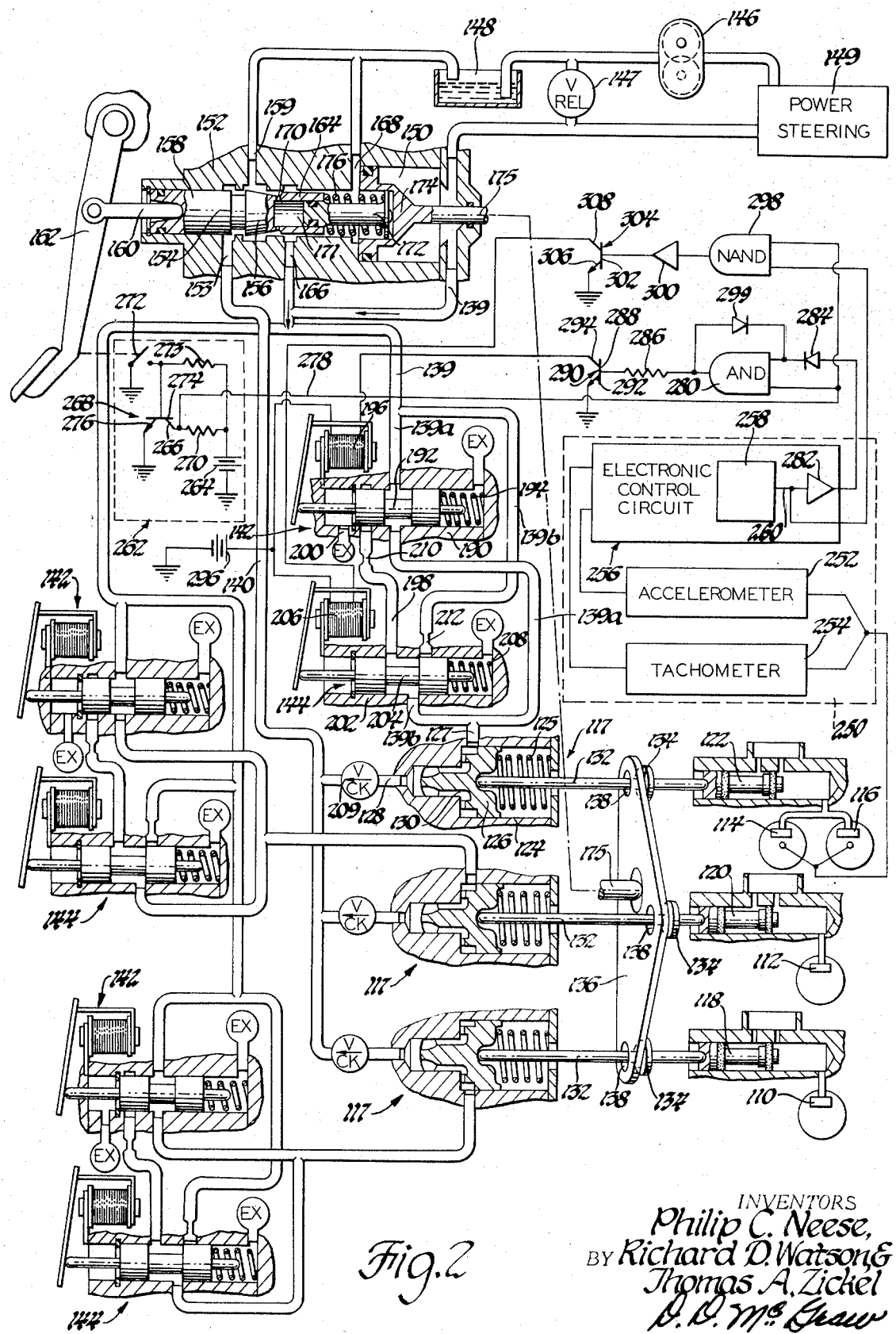

United States Patent
Neese et al.

[15] 3,690,737
[45] Sept. 12, 1972

[54] ANTI-LOCK BRAKE SYSTEM

[72] Inventors: Philip C. Neese, Anderson; Richard D. Watson, Chesterfield; Thomas A. Zickel, Anderson, all of Ind.

[73] Assignee: General Motors Corp., Detroit, Mich.

[22] Filed: Dec. 7, 1970

[21] Appl. No.: 95,468

[52] U.S. Cl. .................................303/21 F, 188/181
[51] Int. Cl. .................................................B60t 8/06
[58] Field of Search .............303/21 F; 188/181, 345

[56] References Cited

UNITED STATES PATENTS 3,524,683  8/1970  Stelzer.......................303/21 F
3,627,386  12/1971  Every........................303/21 F

*Primary Examiner*—Richard A. Schacher
*Attorney*—W. E. Finken and D. D. McGraw

[57] ABSTRACT

An anti-lock brake system includes separate hydraulically boosted master cylinders for each wheel brake or set of wheel brakes to be controlled, a brake control valve to provide fluid pressure for simultaneous actuation of the plurality of hydraulic boosters, an anti-lock control valve circuit associated with each hydraulic booster to control the brakes individually by releasing and reapplying the hydraulic pressure to the hydraulic boosters, and auxiliary actuating means for brake actuation subsequent to a loss of hydraulic pressure.

7 Claims, 3 Drawing Figures

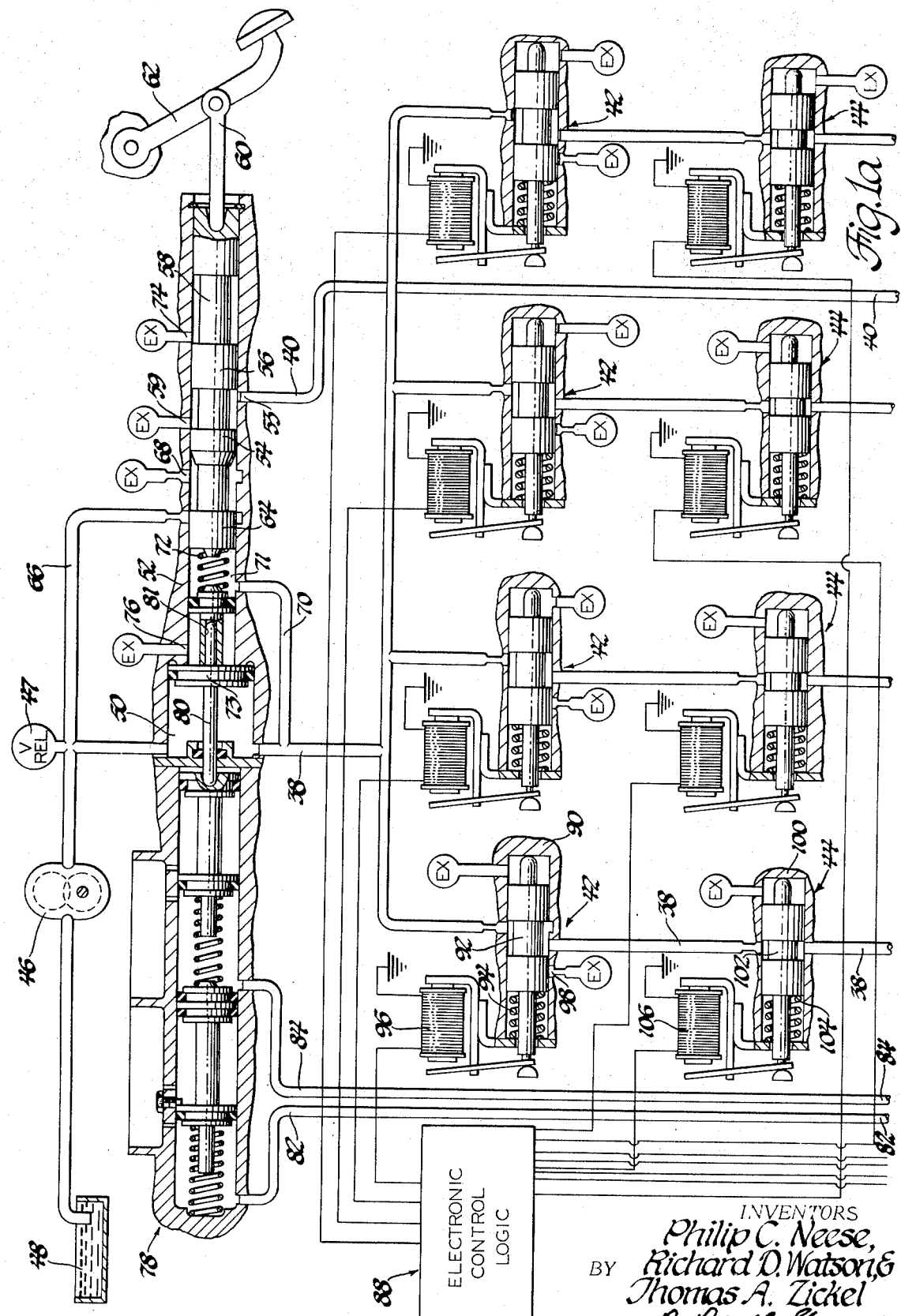

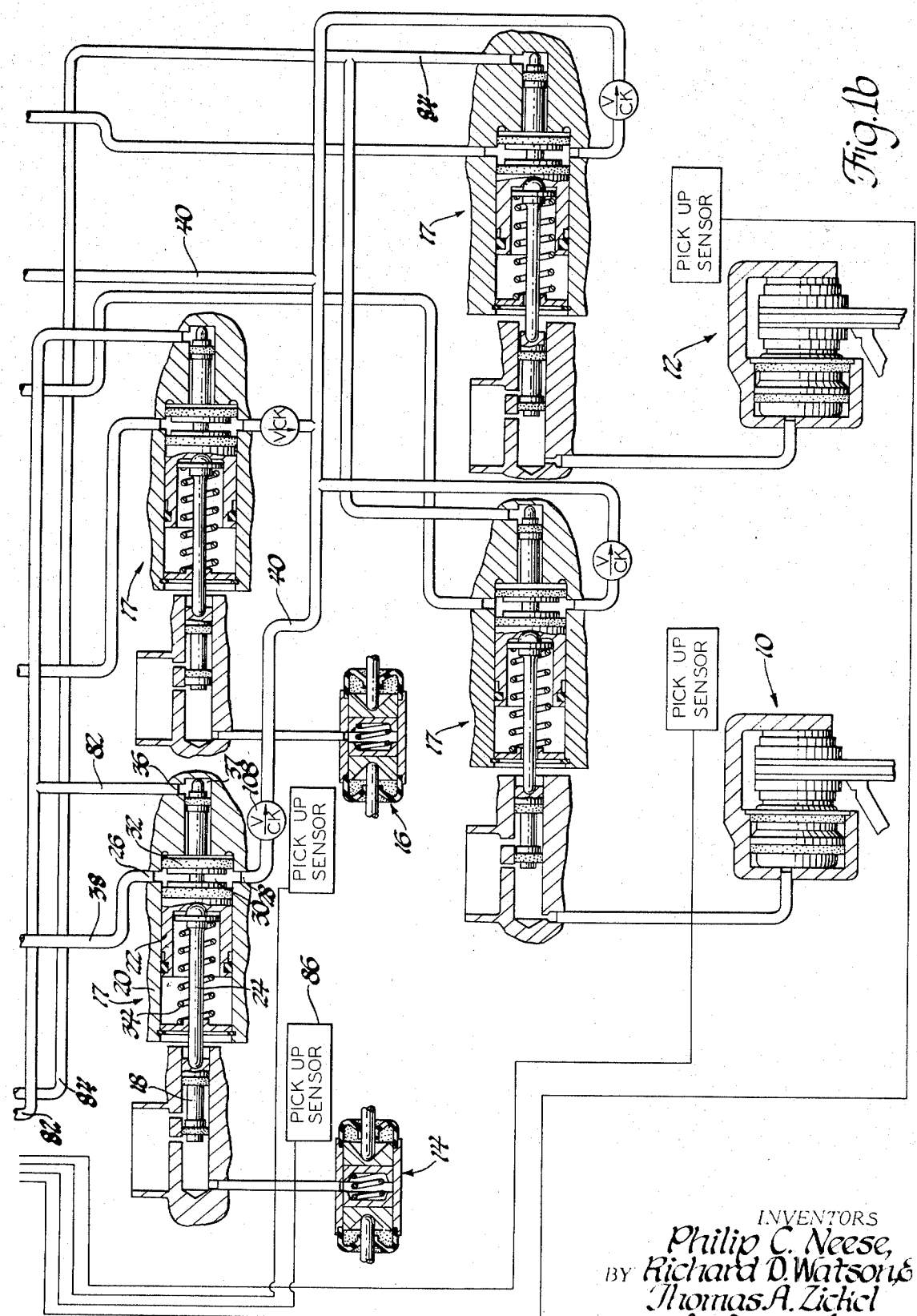

INVENTORS
Philip C. Neese,
BY Richard D. Watson &
Thomas A. Zickel
D. D. McGraw
ATTORNEY

ANTI-LOCK BRAKE SYSTEM

The invention relates to an anti-lock brake system and more particularly includes separate hydraulic power pistons for actuation of master cylinders associated with each wheel brake or set of brakes, and an anti-lock control valve circuit associated with each power piston to control the brakes by selectively releasing and reapplying pressure to the power pistons.

The prior brake anti-lock art discloses braking systems of two general types. The most commonly disclosed brake anti-lock system is based on the principle of interposing a brake fluid pressure modulator intermediate the master cylinder and the controlled wheel brakes. The other general type uses the principle of releasing and reapplying the brake pressure by cyclically actuating and deactuating a vacuum type brake booster.

The present invention relates to an improvement in the latter type anti-lock brake system wherein a master cylinder and hydraulically actuated power piston are mounted in tandem for actuation of each wheel brake or set of brakes to be controlled. Pump generated hydraulic operating fluid flow is channeled to each power piston and returned to the pump reservoir through a brake control valve. Operator actuation of the brake control valve restricts fluid flow to the reservoir thus inducing a back pressure which, acting upon the plurality of power pistons, actuates the vehicle brakes. Anti-lock control valves located intermediate the brake control valve and each power piston are operated to cyclically release and reapply pressure to the power piston and are so arranged that braking is not compromised upon malfunction of one of the valves. Means of auxiliary actuation of the braking system include provision of a master cylinder mounted in tandem with the brake control valve and mechanically actuable upon over-travel thereof to hydraulically actuate a standby piston which abuts each of the power pistons or, alternately, an extension of the reaction piston brake control valve which upon over-travel thereof operatively engages a lever which in turn engages push rods associated with each of the master cylinders to mechanically actuate the master cylinders. In the drawings:

The composite of FIGS. 1a and 1b schematically illustrates an anti-lock brake system embodying the invention and having parts broken away and in section; and FIG. 2 schematically illustrates a second embodiment of the invention having parts broken away and in section.

Referring to FIGS. 1a and 1b, the anti-lock system of this invention is embodied in a motor vehicle having fluid pressure actuated front wheel disk brakes 10 and 12 and fluid pressure actuated rear wheel drum brakes 14 and 16. Associated respectively with each of these fluid pressure operated brakes is an assembly generally indicated at 17, including a master cylinder, a power piston and a standby piston. Inasmuch as this assembly is common to each of the wheel brakes, reference numerals will be assigned and a detailed discussion made in reference to a single one of these assemblies. The master cylinder 18, shown in simplified form, is of the type well known in the prior art and operates to generate braking fluid pressure which is communicated to the fluid pressure operated wheel brake 14 for actuation thereof. The power piston includes a housing 20 in which power piston 22 is slidable to form expansible chamber 30. Housing 20 includes a fluid inlet port 26 and a fluid outlet port 28 which communicate with expansible chamber 30. Introduction of pressurized fluid into housing 20 at fluid inlet port 26 displaces power piston 22 leftwardly actuating the master cylinder 18 through the push rod 24 extending therebetween.

The standby piston portion of assembly 17 provides an auxiliary means of brake actuation. Standby piston 32 is slidable in housing 20, forms a wall of expansible chamber 30 and abuts the power piston 22 when the power piston 22 is in the normal rest position as urged by spring 34. Housing 20 also includes a fluid port 36 which communicates with the expansible chamber 37 formed by standby piston 32 and housing 20. Introduction of fluid pressure at fluid port 36 causes leftward movement of standby piston 32 and the abutting power piston 22 to provide an auxiliary means of actuating the master cylinder 18 independent of pressurization of expansible chamber 30. It is noted that the standby piston 32 is so constructed that hydraulic fluid is not communicated between fluid port 36 and either fluid inlet port 26 or fluid outlet port 28 during auxiliary brake actuation.

A brake control valve is actuatable by the vehicle operator to provide pressurized fluid from a pump for actuation of the brake. The expansible chamber 30 is connected to a source of operating fluid through a supply conduit 38 which is connected to the fluid inlet port 26 and a return conduit 40 which is connected to fluid outlet port 28. Anti-lock control valves, indicated generally at 42 and 44, are interposed in conduit 38 and are normally open to permit free fluid flow therethrough. Fluid pump 46 delivers a continuous flow of operating fluid from fluid reservoir 48 through chamber 50 of valve housing 52 to the conduit 38. Pressure relief valve 47 limits the pressure in the system. The operating fluid flows through conduit 38, anti-lock control valves 42 and 44, expansible chamber 30, and conduit 40 to return port 53 of valve housing 52 where it flows unrestricted between the lands 54 and 56 of brake control valve spool 58 and is exhausted through exhaust port 59 to the fluid reservoir 48. Inasmuch as the flow of operating fluid from pump 46 to the reservoir 48 is unrestricted, the pressure of operating fluid throughout the circuit is substantially zero and therefore does not move the power piston 22. The brake control valve spool 58 is slidable in the valve housing 52 upon axial movement of pedal push rod 60 which connects the brake control valve spool 58 and an operator actuatable brake pedal 62. As the vehicle operator applies progressively increasing force to the brake pedal 62, brake control valve spool 58 is moved leftwardly whereby movement of land 64 thereof opens fluid communication between conduit 66 and exhaust port 68 dumping fluid from pump 46 to fluid reservoir 48, and thus reducing fluid flow through conduits 38 and 40. Subsequently, land 56 blocks operating fluid flow from return port 53 to exhaust port 59 thus terminating the fluid flow through conduits 38 and 40. As the tapered land 54 progressively covers the exhaust port 68, the flow of operating fluid from fluid pump 46 to fluid reservoir 48 is restricted, causing a pressure increase in conduits 38 and 40, and expansible chamber 30 connected thereto. This pressurization of expansible chamber 30 and the consequent forcible leftward movement of power piston 22 actuates master cylinder 18 which in turn actuates the wheel brake 14. The wheel brakes 10, 12 and 16 are applied simultaneously in the same manner.

Pedal feel is provided by pressurization of a chamber 71 at the end of brake control valve spool 58 opposite pedal push rod 60. Conduit 70 communicates the operating fluid pressure in conduit 38 to the chamber 71. This pressure and spring 72 which also acts on the end of brake control valve spool 58 cooperate to provide a reaction force which is transmitted to the brake pedal 62 to provide pedal feel. The spring 72 is seated on a manual piston 73 which is slidably enclosed in valve housing 52. The operating fluid pressure in chamber 50 acts on the relatively large diameter leftward end of manual piston 73 to prevent leftward movement of manual piston 73 by the force of spring 72 and the operating fluid pressure acting on the rightward end thereof. Exhaust ports 74 and 76 are provided in valve housing 52 to vent fluid leakage to the fluid reservoir 48.

The operator releases the brakes by relieving the force applied to pedal 62, thereby allowing brake control valve spool 58 to move rightwardly sequentially opening fluid communication between conduit 66 and exhaust port 68 to exhaust the operating fluid pressure and reestablishing fluid communication between return conduit 40 and fluid reservoir 48 to reestablish fluid flow through conduits 38 and conduit 40. The consequent release of operating fluid pressure from expansible chamber 30 allows power piston 22 to move rightwardly releasing the brake.

In case of interrupted flow of operating fluid through the circuit during braking, auxiliary actuation of the brake is provided by standby piston 32. Pressurized fluid for auxiliary actuation is provided by the master cylinder assembly indicated generally at 78. The master cylinder assembly 78, illustrated as being of the dual pressure chamber type well known in the prior art, is attached to the leftward end of valve housing 52. A push rod 80 is engaged in recess 81 of manual piston 73 and extends sealingly through the wall of valve housing 52 into engagement with master cylinder assembly 78. Due to the absence of operating fluid flow, the brake applying movement of control valve spool 58 by the vehicle operator is not opposed by operating fluid pressure in chamber 71 acting on the leftward end thereof. As the operator progressively moves to the control valve spool 58 leftwardly, the spring 72 collapses allowing abutting engagement of the valve spool 58 and reaction piston 73. A direct force transmitting link is thereby provided between the operator actuated pedal 62 and the master cylinder 78. Actuation of the master cylinder 78 in this manner introduces pressurized fluid to the fluid port 36 through conduit 82. The fluid pressure acting on standby piston 32 displaces it and the abutting power piston 22 leftwardly to actuate the master cylinder 18 and in turn the wheel brake 14. The standby piston associated with brake 16 is also connected to conduit 82 for actuation thereof. Similarly, conduit 84 connects the rear chamber of the master chamber 78 with the standby pistons associated with the front wheel brakes 10 and 12.

Anti-lock control of the brakes is provided by the anti-lock control valves 42 and 44 which are interposed in supply conduit 38. A wheel speed pickup sensor 86 is associated with the vehicle wheel brake 14. Similar pickup sensors are associated with each of the other wheel brakes. The electronic control logic, indicated generally at 88, receives the wheel speed indicating electrical impulses from the pickup sensors and generates control signals for the anti-lock control valves. A suitable example of a pickup sensor and electronic control logic which may be used in conjunction with the present invention is disclosed in U.S. Pat. No. 3,547,501, Harned et al., patented Dec. 15, 1970 and assigned to the common assignee. Anti-lock control valve 42 includes a housing 90 in which valve spool 92 is sealingly slidable. Spring 94 holds valve spool 92 in a normally open position allowing free fluid flow through conduit 38. Solenoid coil 96 is energizable to shift valve spool 92 leftwardly blocking fluid flow through conduit 38 and opening communication of the downstream portion of conduit 38 to the exhaust port 98. Anti-lock control valve 44 includes housing 100 in which valve spool 102 is sealingly slidable. Spring 104 normally positions valve spool 102 in the open position permitting free fluid flow through conduit 38. Energization of solenoid coil 106 shifts valve spool 102 leftwardly whereby fluid flow is blocked through conduit 38.

Upon sensing an impending wheel lock condition, the electronic control logic 88 energizes coil 96 thereby shifting valve spool 92 leftwardly to block fluid pressure communication between expansible chamber 30 and fluid pump 46 and opening fluid communication between the expansible chamber 30 and the fluid reservoir 48 which is connected to exhaust port 98. The resulting pressure decrease in expansible chamber 30 releases the wheel brake 14 at least partially allowing the wheel to begin accelerating. Check valve 108 is connected in return conduit 40 adjacent fluid outlet port 28 and acts to isolate conduit 40 from expansible chamber 30 during the brake release mode of anti-lock operation so that the pressure acting on the power pistons associated with the other wheel brakes is not affected. The electronic control logic 88 then energizes coil 106 to shift valve spool 102 leftwardly, blocking communication of expansible chamber 30 with the fluid reservoir 48 to hold the decreased pressure in expansible chamber 30 while the wheel continues to accelerate. Then, when the impending wheel lock condition has been arrested, the electronic control logic 88 deenergizes solenoid coils 96 and 106 allowing springs 94 and 104 to return valve spools 92 and 102 to their normally open positions wherein fluid pressure communication through conduit 38 is reestablished and the brakes reapplied by the resulting pressure increase in expansible chamber 30. Identical anti-lock control valves are associated with the wheel brakes 10, 12 and 16 and are individually actuatable to control the respective wheels in accordance with their particular condition.

Referring now to FIG. 2, a second embodiment of the invention is shown. The invention is embodied in a motor vehicle having fluid pressure actuated front wheel brakes 110 and 112, and fluid actuated rear wheel brakes 114 and 116. The front wheel brakes 110 and 112 are respectively fluidly connected to the conventional master cylinders 118 and 120. The rear wheel brakes 114 and 116 are fluidly connected to the conventional master cylinder 122. Associated respectively with each of these fluid pressure operated brakes is a power piston assembly, indicated generally at 117. Reference numerals will be assigned and a detailed description made in reference to a single one of the typical assemblies. The housing 124 and power piston 126 sealingly slidable therein cooperate to form an expansible chamber 130 which communicates with fluid inlet port 127 and fluid outlet port 128 which are formed in housing 124. Spring 125 defines the rest position of power piston 126. Introduction of pressurized fluid into expansible chamber 130 displaces power piston 126 rightwardly actuating the master cylinder associated therewith through the push rod 132 extending therebetween. Each of the push rods 132 includes a knob 134 formed thereon intermediate the power piston assembly and the master cylinder. A lever 136 includes three holes 138 through which the push rods 132 extend. The lever 136 is located intermediate the power piston assembly and the knob 134 so as to permit unitary brake applying movement of push rod 132 and power piston 126 without moving lever 136, and yet allowing engagement of lever 136 with the knobs 134 to permit lever actuation of the master cylinders 118, 120, and 122, independently of power piston actuation.

A brake control valve is actuable by the vehicle operator to provide pump generated fluid pressure for actuation of the brakes. The expansible chamber 130 is connected to a source of operating fluid through a supply conduit 139 and its parallel branches 139a and 139b which are connected to the fluid inlet port 127, and through a return conduit 140 which is connected to the fluid outlet port 128. Anti-lock control valves, indicated generally at 142 and 144, to be fully described hereinafter, are respectively interposed in the parallel branches 139a and 139b of conduit 139 and are during normal braking open to permit free fluid flow therethrough. A fluid pump 146, illustrated as being a power steering pump, delivers a continuous flow of operating fluid from the pump reservoir 148 through the open center power steering gear 149 and through chamber 150 of valve housing 152 to the conduit 139. Pressure relief valve 147 limits the pressure which is developed in the circuit. The operating fluid flows through supply conduit 139, anti-lock control valves 142 and 144, expansible chamber 30, and return conduit 140 to return port 153 of valve housing 152 where it flows unrestricted between the lands 154 and 156 of brake control valve spool 158 and is exhausted through exhaust port 159 to the pump reservoir 148. Since the flow of operating fluid from pump 146 to the reservoir 148 is unrestricted, the operating fluid pressure throughout the fluid circuit is substantially zero and does not move the power piston 126. The brake control valve spool 158 is slidable in valve housing 152 upon axial movement of pedal push rod 160 which connects the brake control valve spool 158 and an operator actuable brake pedal 162. Progressive operator actuation of brake pedal 162 moves brake control valve spool 158 rightwardly whereby fluid flow through the supply conduit 139 and return conduit 140 is reduced as land 154 blocks communication of the return conduit 140 with the exhaust port 159 and the land 164 simultaneously opens fluid communication between supply conduit 139 at fluid port 166 and exhaust port 159. Rightward movement of the tapered land 156 progressively covers the exhaust port 159, thereby restricting the flow of operating fluid from port 166 to exhaust port 159. The resultant pressure increase in conduits 139 and 140, and expansible chamber 130 connected thereto forcibly moves power piston 126 rightwardly to simultaneously actuate the master cylinders 118, 120, and 122, and in turn the wheel brakes associated respectively therewith.

Pedal feel is provided by pressurization of chamber 171 which is formed within the brake control valve spool 158. The chamber 171 extends axially into the rightward end of control valve spool 158 and communicates with fluid port 166 through radially extending ports 170. One end of reaction piston 172 is sealingly slidable in chamber 171 and forms a wall thereof. The other end of reaction piston 172 engages the manual piston 174 which is sealingly slidable in valve housing 152. Manual piston 174 forms a wall of chamber 150 with the result that it is made immovable by the operating fluid pressure in chamber 150 acting thereon during brake actuation. Consequently, the abutting reaction piston 172 is held stationary and the operating fluid pressure communicated to expansible chamber 171 through port 170 acts on the control valve 158 urging it leftwardly in opposition of the operator applied pedal force. This reaction force is proportional to the degree of brake pedal actuation as determined by the pressure in supply conduit 139. Spring 176 acts between the reaction piston 172 and brake control valve spool 158 to define the rest position of valve spool 158 and also provide an additional reaction force.

The operator releases the brakes by relieving the force applied to the brake pedal 162, thereby allowing the brake control valve spool 158 to move leftwardly exhausting the increased pressure to the pump reservoir 148 and re-establishing unrestricted fluid flow through conduits 138 and 140. The consequent release of operating fluid pressure from expansible chamber 130 allows power piston 126 to move leftwardly releasing the brake.

In case of interrupted flow of operating fluid through the circuit during braking, an auxiliary brake actuates the brakes. A portion 175 of manual piston 174 extends axially through the wall of valve housing 152 into engagement with lever 136. Due to the absence of operating fluid flow, the brake applying movement of control valve spool 158 by the vehicle operator is not opposed by operating fluid pressure in chamber 171 acting on the leftward end thereof. As the operator progressively moves the control valve spool 158 leftwardly, the spring 176 collapses allowing abutting engagement of valve spool 158 and reaction piston 172. The consequent abutting engagement of valve spool 158, reaction piston 172, manual piston 174, lever 136, and the knobs 134 of the push rods 132 associated with the master cylinders 118, 120 and 122, provides a rigid force transmitting link between the operator actuated pedal 62 and the master cylinders 118, 120 and 122.

Anti-lock control of the brakes is provided by the anti-lock control valves 142 and 144 which are interposed in parallel branches 139a and 139b of supply conduit 139. Anti-lock control valve 142 includes a housing 190 in which valve spool 192 is sealingly slidable. Spring 194 normally holds valve spool 192 in the open position allowing free fluid flow through conduit 139a. Solenoid coil 196 is energizable to shift valve spool 92 rightwardly blocking fluid flow through conduit 139a and opening communication between conduit 198 and exhaust port 200. Anti-lock control valve 144 includes housing 202 in which valve spool 204 is sealingly slidable. Solenoid coil 206 is during normal braking energized to hold valve spool 204 in the open position allowing free fluid flow through conduit 139b. Spring 208 shifts valve spool 204 leftwardly upon deenergization of solenoid coil 206 to block fluid flow through conduit 139b. and open fluid communication between power piston inlet port 127 and conduit 198.

Energization of the solenoid valves 142 and 144 is by a wheel condition sensor and control logic 250 and additional control circuitry to be hereinafter described. The wheel condition sensor and control logic 250 is fully disclosed in U.S. Pat. No. 3,524,685, by Harned et al. The wheel condition sensor and control logic includes generally a pair of wheel rotation transducers comprising an accelerometer 252 and a tachometer 254 which are mechanically driven by a vehicle wheel drive, or in this particular instance by the propeller shaft driving the pair of rear wheels associated with rear wheel brakes 114 and 116. The transducers 252 and 254 produce electrical signals which are proportional to wheel acceleration or deceleration and velocity, and which operate an electronic control circuit 256. The electronic control circuit 256 produces an output signal calling for either brake application or brake release. It is sufficient for the purposes of this disclosure to note that the electronic control circuit 256 includes a flip-flop circuit 258 having an output 260 which is OFF when there is an impending wheel lock, and is ON when the impending wheel lock has been arrested. A brake switch circuit 262 provides a signal which is responsive to pedal actuation. A voltage source 264 is connected to collector 266 of transistor 268 through a resistor 270. The brake switch 272 is connected to the power source 264 through a resistor 273. The base 274 of transistor 268 is connected to the brake switch 272, and the emitter 276 is grounded. The output 278 of brake switch circuit 262 is connected to the collector 266. When the brake pedal is not actuated, brake switch 272 is open and the base 274 connected thereto is at a high voltage causing transistor 268 to conduct from collector 266 to emitter 276 so that the output 278 is effectively grounded and consequently the output 278 is OFF. When the brake pedal is actuated, brake switch 272 is closed grounding base 274. When the base 274 is grounded transistor 268 does not conduct and consequently the output 278 is ON.

The output 278 of brake switch circuit 262 and the output 260 of electronic control circuit 256 cooperate to operate anti-lock control valves 142 and 144. Control valve 142 is operated by an AND gate 280 having the brake switch output 278 connected directly thereto as one input and electronic control circuit output 260 connected thereto through an inverting amplifier 282 and a diode 284 as a second input. The output of AND gate 280 is connected through a resistor 286 to the base 288 of transistor 290. Emitter 292 of transistor 290 is grounded. Collector 294 is connected to one end of the solenoid coil 196 of anti-lock control valve 142, and the other side of coil 196 is connected to a voltage source 296. The output of AND gate 280 is ON when the outputs of both the brake switch circuit 262 and the inverting amplifier 282 are ON. The output of AND gate 280 is connected through a diode 299 to the AND gate input from inverting amplifier 282, providing positive feedback so that once the AND gate is turned ON it will remain ON until the AND gate input from the brake switch circuit 262 is OFF. Diode 284 connected between diode 299 and inverting amplifier 282 isolates the feedback from the inverting amplifier 282. When the output of AND gate 280 is OFF, the solenoid coil 196 is also OFF inasmuch as transistor 290 does not conduct to ground. When the output of AND gate 280 is ON, transistor 290 conducts to ground and so solenoid 196 is energized.

Output 278 of brake switch circuit 262 and output 260 of electronic control circuit 256 are connected as inputs to NAND gate 298. The output of NAND gate 298 is ON at all times excepting when both inputs 278 and 260 are ON. The output of NAND gate 298 is inverted by inverting amplifier 300. The output of inverting amplifier 300 is connected to the base 302 of transistor 304. Emitter 306 of transistor 304 is grounded and the collector 308 is connected to one end of coil 206 of anti-lock control valve 144. The other end of solenoid coil 206 is connected to power source 296. When the output of NAND gate is ON the output of inverting amplifier 300 is OFF and so transistor 304 does not conduct and coil 206 is deenergized. When the output of NAND gate 298 is OFF, the output of inverting amplifier 300 is ON and so transistor 304 conducts to connect the one side of solenoid coil 206 to ground energizing the coil.

During normal driving without brake actuation, output 278 is OFF and output 260 is ON, and consequently, as hereinbefore described, the control valves 142 and 144 are both in their normal deenergized positions. When the vehicle operator applies the brake, the brake switch 272 is closed turning output 278 ON and consequently energizing solenoid coil 206 to hold valve spool 204 in the open position allowing fluid flow through conduit 139b as well as conduit 139a. If the brakes are applied to such an extent that an impending wheel lock condition is created, the output 260 is turned OFF causing energization of solenoid coil 196 and deenergization of solenoid coil 206. Consequently, valve spools 192 and 204 are shifted to respectively block fluid pressure communication through the parallel supply branches 139a and 139b and exhaust the fluid pressure in expansible chamber 130 through conduit 198 to exhaust port 200. The orifice 210 in conduit 198 meters the fluid flow to exhaust port 200 so as to release power piston 126 at a controlled rate. Check valve 209 is located intermediate the outlet port 128 and return conduit 140 and acts to isolate the return conduit 140 from the expansible chamber 130 during the brake release mode of anti-lock operation so that fluid pressure is not exhausted from the other power pistons.

When the impending wheel lock condition has been arrested, the output 260 is again turned ON causing energization of solenoid coil 206 and consequent rightward shifting of valve spool 204 whereby flow to conduit 198 is blocked and fluid communication to expansible chamber 130 is again established through conduit 139b. The orifice 212 in conduit 139b at the inlet side of the anti-lock control valve 144 meters the fluid flow to the expansible chamber 130 to control the rate at which the brake is reapplied. If the impending wheel lock condition is again encountered, output 260 is again turned OFF shifting control valve 144 to again release the brake, and then when the wheel lock condition has again been arrested the output 260 is turned ON causing the brake to be applied once again. The wheel condition sensor and control logic 250 cycles anti-lock control valve 144 in this manner until the impending wheel lock condition is no longer encountered due to brake pedal deactuation or the vehicle having been brought to a stop. When the brake pedal is deactuated, the brake switch 272 is opened, turning the output 278 OFF whereby solenoid coil 196 of control valve 142 is deenergized returning valve spool 192 to its normal position reestablishing unrestricted fluid communication through conduit 139a to the expansible chamber 130.

Arrangement of the anti-lock control valves 142 and 144 in the aforedescribed manner provides an anti-lock operating circuit wherein, if one of the valves does not shift, fluid communication between the fluid pump and the power piston is assured. For example, if either one of the valves does not shift during initiation of the release mode of anti-lock operation the valve not shifted blocks flow to the exhaust port 200 so that while the wheel lock is not prevented, neither is fluid pressure exhausted from expansible chamber 130. If, following anti-lock release of the brake, the valve spool 204 does not return to its rightward position, the eventual return of valve spool 192 to its normal position upon release of pedal force reestablishes fluid flow through conduit 139a to reapply the brake. Generally stated, the provision of parallel conduit branches 139a and 139b with the respective anti-lock control valves interposed therein in the aforedescribed manner, assures that if either of one of the valves blocks fluid communication through its respective branch, fluid flow will be established through the other branch.

It is noted that while the anti-lock brake system of this invention has herein been described as including solenoid actuated anti-lock control valves operated by an electronic control logic, it is within the scope of this invention to utilize alternate means of wheel condition sensing which may operate the anti-lock control valves hydraulically or mechanically.

Furthermore, the anti-lock valve circuit of this invention may be advantageously used in conjunction with a fluid pressure operated brake pressure modulator located intermediate the master cylinder and wheel brake.

What is claimed is:

1. In a vehicle having a plurality of wheels, fluid pressure operated wheel brakes associated respectively with the wheels for imparting braking effort thereto, wheel condition sensing and control logic means monitoring wheel deceleration and providing signals in accordance therewith, fluid pump means providing hydraulic operating fluid, and a hydraulic fluid reservoir, the combination of:

a plurality of piston means, each being fluidly connected to a wheel brake or set of wheel brakes for actuation thereof in proportion to an operating fluid pressure acting on the respective piston means;

brake control valve means normally communicating operating fluid at reservoir pressure to the plurality of piston means and including operator actuable means adapted to actuate the brake control valve means to channel pressurized operating fluid to each of the piston means and to act on the brake control valve means to provide a reaction force thereon;

anti-lock control valve means associated with at least one of the piston means and normally communicating thereto the pressurized operating fluid provided by the brake control valve means, the anti-lock control valve means being cyclically shifted by the wheel condition sensing and control logic signal to exhaust and re-apply the pressurized operating fluid to the piston means whereby the rate of wheel deceleration is controlled;

auxiliary piston means located coaxially with each of the piston means and engageable in force transmitting therewith for actuation of the piston means independently of the operating fluid pressure acting thereon;

and auxiliary master cylinder means engaged by the brake control valve means upon operator actuated overtravel thereof upon loss of reaction force provided by operating fluid pressure to provide pressure to each of the auxiliary piston means whereby the piston means are actuated in unison.

2. In a vehicle having a plurality of wheels, fluid pressure operated wheel brakes associated respectively with the wheels for imparting braking effort thereto, wheel condition sensing and control logic means monitoring wheel deceleration and providing signals in accordance therewith, fluid pump means providing a continuous flow of operating fluid, and a fluid reservoir, the combination of:

a master cylinder fluidly connected to each of the wheel brakes or set of wheel brakes for actuation thereof;

piston means operatively engaging each of the master cylinders;

conduit means communicating the operating fluid from the fluid pump means to each of the piston means;

brake control valve means normally communicating the operating fluid to the fluid reservoir, whereby the operating fluid pressure acting upon each of the piston means is substantially zero;

operator actuable means adapted to shift the brake control valve means to restrict fluid communication with the reservoir whereby the increase in operating fluid pressure acts on each of the piston means to simultaneously actuate each of the master cylinders;

anti-lock control valve means associated respectively with at least one of the piston means and located in said conduit means fluidly intermediate the pump means and the piston means and being normally open to allow free fluid communication therebetween, the anti-lock control valve means being shifted individually by the wheel condition sensing and control logic signal to reduce and reapply operating fluid pressure acting on the piston means whereby the rate of wheel deceleration is controlled;

the operating fluid pressure acting on the brake control valve means to provide a reaction force on said operator actuable means;

auxiliary piston means located coaxially with each of the piston means and engageable therewith for actuation of the master cylinders independently of the operating fluid pressure acting on the piston means;

and auxiliary master cylinder means engageable with and actuated by the brake control valve means upon operator actuated overtravel thereof upon loss of operating fluid flow to pressurize each of the auxiliary piston means whereby the master cylinders are actuated in unison.

3. In a vehicle having a plurality of wheels, fluid pressure operated wheel brakes associated respectively with the wheels for imparting braking effort thereto, wheel condition sensing and control logic means monitoring wheel deceleration and providing signals in accordance therewith, fluid pump means providing a continuous flow of operating fluid, and a fluid reservoir, the combination of:

a master cylinder fluidly connected to each of the wheel brakes or set of wheel brakes for actuation thereof;

piston means associated with each of the master cylinders;

a push rod associated with each piston means and having a first end engaging the piston means and a second end engaging the master cylinder associated therewith, the push rod having a knob located thereon intermediate the ends;

conduit means communicating the operating fluid from the fluid pump means to each of the piston means;

brake control valve means normally communicating the operating fluid to the fluid reservoir, whereby the operating fluid pressure acting upon each of the piston means is substantially zero;

operator actuable means adapted to shift the brake control valve means to restrict fluid communication with the reservoir whereby the increase in operating fluid pressure acts on each of the piston means to simultaneously actuate each of the mater cylinders;

anti-lock control valve means associated respectively with at least one of the piston means and located in said conduit means fluidly intermediate the pump means and the piston means and being normally open to allow free fluid communication therebetween, the anti-lock control valve means being shifted individually by the wheel condition sensing and control logic signal to reduce and reapply operating fluid pressure acting on the piston means whereby the rate of wheel deceleration is controlled;

the operating fluid pressure acting on the brake control valve means to provide a reaction force on said operator actuable means;

lever means having a plurality of holes therethrough, the push rods extending through the holes with the lever located intermediate the piston means and the knobs;

manual piston means abutting the lever and engageable with the brake control valve means upon operator actuated overtravel thereof upon loss of operating fluid flow to actuate the master cylinders independently of the piston means.

4. In a vehicle having a plurality of wheels, fluid pressure operated wheel brakes associated respectively with the wheels for imparting braking effort thereto, wheel condition sensing and control logic means monitoring wheel deceleration and providing signals in accordance therewith, fluid pump means providing a continuous flow of operating fluid, and a fluid reservoir, the combination of:

a master cylinder fluidly connected to each of the wheel brakes or set of wheel brakes for actuation thereof;

piston means operatively engaging each of the master cylinders;

conduit means communicating the operating fluid from the fluid pump means to each of the piston means;

brake control valve means normally communicating the operating fluid to the fluid reservoir, whereby the operating fluid pressure acting upon each of the piston means is substantially zero;

operator actuable means adapted to shift the brake control valve means to restrict fluid communication with the reservoir whereby the increase in operating fluid pressure acts on each of the piston means to simultaneously actuate each of the master cylinders;

the operating fluid pressure acting on the brake control valve means to provide a reaction force on the operator actuable means;

first and second conduits in parallel flow relationship interposed in the conduit means communicating operating fluid from the fluid pump means to at least one of the piston means and including first and second anti-lock control valves located respectively in the first and second conduits, the anti-lock control valve circuit including;

the first anti-lock control valve in the first conduit having a normal condition communicating operating fluid to the associated piston means and being shiftable to another condition to block fluid communication between the fluid pump means and the piston means and open fluid communication between a valve port and the fluid reservoir, the second anti-lock control valve in the second conduit having a normal condition communicating operating fluid to the associated piston means and being shiftable to another condition to block fluid communication between the fluid pump means and the piston means and open communication between the piston means and the valve port of the first anti-lock control valve, fluid flow restricting means in the second conduit, valve operating means associated with each of the first and second anti-lock control valve and actuable by the wheel condition sensing and control logic means upon impending wheel lock condition to shift the first and second valves from the normal condition to the another condition whereby operating fluid pressure communication is blocked and the operating fluid pressure in the piston means is exhausted to the fluid reservoir to release the wheel brake, when the impending wheel lock condition has been arrested the second anti-lock control valve is shifted to the normal condition whereby communication of pressurized operating fluid is opened and the piston means actuated at a controlled rate through the fluid flow restriction means to reapply the wheel brake, and subsequent to brake reapplication the first anti-lock control valve being returned to the normal condition to reestablish unrestricted fluid communication through the first conduit.

5. In a motor vehicle having wheels, fluid pressure operated wheel brakes adapted to impart braking effort to the wheels, means providing braking pressure for operation of the wheel brakes, brake pressure controlling means responsive to pressure variations and effective to modulate braking pressure to the wheel brakes for preventing wheel lockup, pump means including a reservoir and providing fluid pressure for operation of the brake pressure controlling means, and wheel condition sensing and control logic means, a valve circuit operated by the wheel condition sensing and control logic means and adapted to provide the pressure variations for operation of the brake pressure controlling means and comprising:

first and second conduits in parallel flow relationship connecting the pump means and the brake pressure controlling means;

a first valve means interposed in the first conduit and having a normal condition communicating pressure from the pump means to the brake pressure controlling means and being shiftable to another condition blocking communication to the brake pressure controlling means and opening communication between a first valve port and the fluid reservoir;

a second valve means interposed in the second conduit and having a normal condition communicating pressure to the brake pressure controlling means and being shiftable to another condition blocking communication to the brake pressure controlling means and opening communication between a second valve port and the motor;

conduit means connecting the first valve port and the second valve port whereby when the first and the second valve means are both in the another condition, pressure is exhausted from the brake pressure controlling means;

and when one of the valve means is in the normal condition and the other is in the another condition, the valve means in normal condition is effective to establish fluid communication with the brake pressure controlling means through the associated conduit and blocks fluid communication between the brake pressure controlling means and the reservoir.

6. In a motor vehicle having wheels, fluid pressure operated wheel brakes adapted to impart braking effort to the wheels, means providing braking pressure for operation of the wheel brakes, brake pressure controlling means responsive to pressure variations and effective to modulate braking pressure to the wheel brakes for preventing wheel lockup, pump means including a reservoir and providing fluid pressure for operation of the brake pressure controlling means, and wheel condition sensing and control logic means, a valve circuit operated by the wheel condition sensing and control logic means and adapted to provide the pressure variations for operation of the brake pressure controlling means and comprising:

first and second conduits in parallel flow relationship connecting the pump means and the brake pressure controlling means;

a first anti-lock control valve interposed in the first conduit and having a normal condition communicating pressure to the brake pressure controlling means and being shiftable to another condition blocking communication to the brake pressure controlling means and opening communication between a first valve port and the fluid reservoir;

a second anti-lock control valve interposed in the second conduit and having a normal condition communicating pressure to the brake pressure controlling means and being shiftable to another condition blocking communication to the brake pressure controlling means and opening communication between a second valve port and the brake pressure controlling means;

conduit means connecting the first valve port and the second valve port whereby when the first and second antilock control valves are both in the another condition fluid pressure is exhausted from the brake pressure controlling means whereby the brake pressure is reduced to allow wheel acceleration;

and when one of the anti-lock control valves is in the normal condition and the other anti-lock control valve is in the another condition pressure communication between the brake pressure controlling means and the fluid reservoir is blocked and fluid communication between the pump means and the brake pressure controlling means is established through the conduit associated with the anti-lock control valve which is in the normal condition whereby fluid pressure communication is provided between the pump means and the brake pressure controlling means to selectively increase the braking pressure subsequent to a prior brake pressure decrease or to hold the level of braking pressure if not previously decreased.

7. In a vehicle having a plurality of wheels, fluid pressure operated wheel brakes associated respectively with the wheels for imparting braking effort thereto, wheel condition sensing and control logic means monitoring wheel deceleration and providing signals in accordance therewith, fluid pump means providing a continuous flow of operating fluid, and a fluid reservoir, the combination of:

a master cylinder fluidly connected to each of the wheel brakes or set of wheel brakes for actuation thereof;

piston means operatively engaging each of the master cylinders;

conduit means communicating the operating fluid from the fluid pump means to each of the piston means;

brake control means normally communicating the operating fluid to the fluid reservoir, whereby the operating fluid pressure acting upon each of the piston means is substantially zero;

operator actuable means adapted to shift the brake control valve means to restrict fluid communication with the reservoir whereby the increase in operating fluid pressure acts on each of the piston means to simultaneously actuate each of the master cylinders;

the operating fluid pressure acting on the brake control valve means to provide a reaction force on the operator actuable means proportional to braking effort;

means connecting the brake control valve means and the plurality of master cylinders whereby overtravel of brake control valve means upon loss of operating fluid flow unitarily actuates the master cylinders;

first and second conduits in parallel flow relationship interposed in each of the conduit means communicating the operating fluid from the fluid pump means to each of the piston means and including first and second solenoid actuated anti-lock control valves located respectively in each of the first and second conduits, the anti-lock control valve circuit including;

the first solenoid actuated anti-lock control valve means in the first conduit having a normal spring held condition communicating operating fluid to the associated piston means and being shifted to another condition upon solenoid energization to block fluid communication between the fluid pump means and the piston means and open fluid communication between a valve port and the fluid reservoir, the second solenoid actuated anti-lock control valve means in the second conduit having a normal energized condition communicating operating fluid to the associated piston means and being spring shifted to another condition upon solenoid deenergization to block fluid communication between the fluid pump means and the piston means and open communication between the piston means and the valve port of the first anti-lock control valve, fluid flow restricting means in the second conduit, the first and second anti-lock control valve means being actuable by the wheel condition sensing and control logic means upon impending wheel lock condition to shift the first and second valves from the normal condition to the another condition whereby operating fluid pressure communication is blocked and the operating fluid pressure in the piston means is exhausted to the fluid reservoir to release the wheel brake, when the impending wheel lock condition has been arrested the second anti-lock control valve being shifted to the another condition whereby communication of pressurized operating fluid is opened and the piston means actuated at a controlled rate through the fluid flow restriction means to reapply the wheel brake, and subsequent to brake reapplication the first anti-lock control valve being returned to the normal condition to reestablish unrestricted fluid communication through the first conduit.

* * * * *

UNITED STATES PATENT OFFICE
CERTIFICATE OF CORRECTION

Patent No. 3,690,737      Dated September 12, 1972

Inventor(s) Philip C. Neese, Richard D. Watson, Thomas A. Zickel

It is certified that error appears in the above-identified patent and that said Letters Patent are hereby corrected as shown below:

Column 1, line 39, delete "reaction piston"; line 44, delete "In the"; line 45, insert -- In the --. Column 6, line 48, after "brake" insert, --actuating means--. Column 7, line 16, after "139b" delete the "." (period). Column 11, line 48, change "mater" to --master--. Column 15, line 1, after "control" insert --valve--.

Signed and Sealed this thirteenth Day of January 1976

[SEAL]

Attest:

RUTH C. MASON
*Attesting Officer*

C. MARSHALL DANN
*Commissioner of Patents and Trademarks*